United States Patent
Schneider et al.

(10) Patent No.: US 10,895,750 B2
(45) Date of Patent: Jan. 19, 2021

(54) CONICAL OPTICAL COMBINER

(71) Applicant: Elbit Systems Ltd., Haifa (IL)

(72) Inventors: Ron Schneider, Haifa (IL); Gil Benesh, Haifa (IL); Aron Arlievsky, Haifa (IL)

(73) Assignee: Elbit Systems Ltd., Haifa (IL)

( * ) Notice: Subject to any disclaimer, the term of this patent is extended or adjusted under 35 U.S.C. 154(b) by 0 days.

(21) Appl. No.: 16/765,505

(22) PCT Filed: Nov. 20, 2018

(86) PCT No.: PCT/IL2018/051250
§ 371 (c)(1),
(2) Date: May 20, 2020

(87) PCT Pub. No.: WO2019/097522
PCT Pub. Date: May 23, 2019

(65) Prior Publication Data
US 2020/0319462 A1 Oct. 8, 2020

(30) Foreign Application Priority Data
Nov. 20, 2017 (IL) .......................................... 255795

(51) Int. Cl.
*G02B 27/01* (2006.01)
*G02F 1/00* (2006.01)

(52) U.S. Cl.
CPC ..... *G02B 27/0172* (2013.01); *G02B 27/0179* (2013.01); *G02B 2027/011* (2013.01);
(Continued)

(58) Field of Classification Search
CPC ............ G02B 27/0172; G02B 27/0179; G02B 2027/0118; G02B 2027/0187;
(Continued)

(56) References Cited

U.S. PATENT DOCUMENTS 5,943,171 A * 8/1999 Budd ................. G02B 27/0172
359/631
5,991,085 A * 11/1999 Rallison ............... G02B 27/017
345/8
(Continued)

FOREIGN PATENT DOCUMENTS

WO        WO 98/20381         5/1998

OTHER PUBLICATIONS

International Search Report and Written Opinion for PCT Application No. PCT/IL2018/051250, dated Feb. 11, 2019.
(Continued)

*Primary Examiner* — George G King
(74) *Attorney, Agent, or Firm* — Pearl Cohen Zedek Latzer Baratz LLP

(57) ABSTRACT

Optical systems and methods are provided, which combine see-through view of the real world and display source images using a conical optical combiner cut to have flat surfaces normal to the viewer line of sight. The conical shape minimizes interferences in the view of the real world as the edges of the optical combiner are tangent to the viewer vision field of view and the inner part of the optical combiner is semitransparent. Additionally, the optical system comprises a beam splitter, a shutter(s) for attenuating or blocking the see-through path and may employ polarizing element to improve the contrast between the scene observation and the projected display and thus enabling selective viewing of either. The system may also be configured to enable diopter adjustment and virtual display distance adjustments.

9 Claims, 5 Drawing Sheets

(52) U.S. Cl.
CPC  *G02B 2027/013* (2013.01); *G02B 2027/0118* (2013.01); *G02B 2027/0134* (2013.01); *G02B 2027/0187* (2013.01)

(58) Field of Classification Search
CPC ...... G02B 2027/011; G02B 2027/0134; G02B 2027/013; G02B 2027/0132; G02B 2027/0154; G02B 2027/0156; G02B 2027/0178; G02B 27/017
USPC ............................................ 359/631, 489.09
See application file for complete search history.

(56) References Cited

U.S. PATENT DOCUMENTS

| | | | |
|---|---|---|---|
| 7,362,507 B2* | 4/2008 | Duncan | G02B 27/283 |
| | | | 359/489.09 |
| 9,091,851 B2* | 7/2015 | Border | G02B 27/0172 |
| 2010/0195056 A1 | 8/2010 | Yoo et al. | |
| 2012/0119978 A1 | 5/2012 | Border et al. | |
| 2012/1021240 | 8/2012 | Border et al. | |
| 2015/0153577 A1 | 6/2015 | Nikitin et al. | |
| 2016/1002625 | 1/2016 | Bradski et al. | |
| 2016/0139413 A1 | 5/2016 | Gribetz et al. | |
| 2017/0212352 A1 | 7/2017 | Cobb et al. | |
| 2019/0004327 A1* | 1/2019 | Ouderkirk | G03B 21/2066 |

OTHER PUBLICATIONS

The Extended European Search Report issued for EP Patent Application No. EP18877916.9, dated Dec. 4, 2020.

* cited by examiner

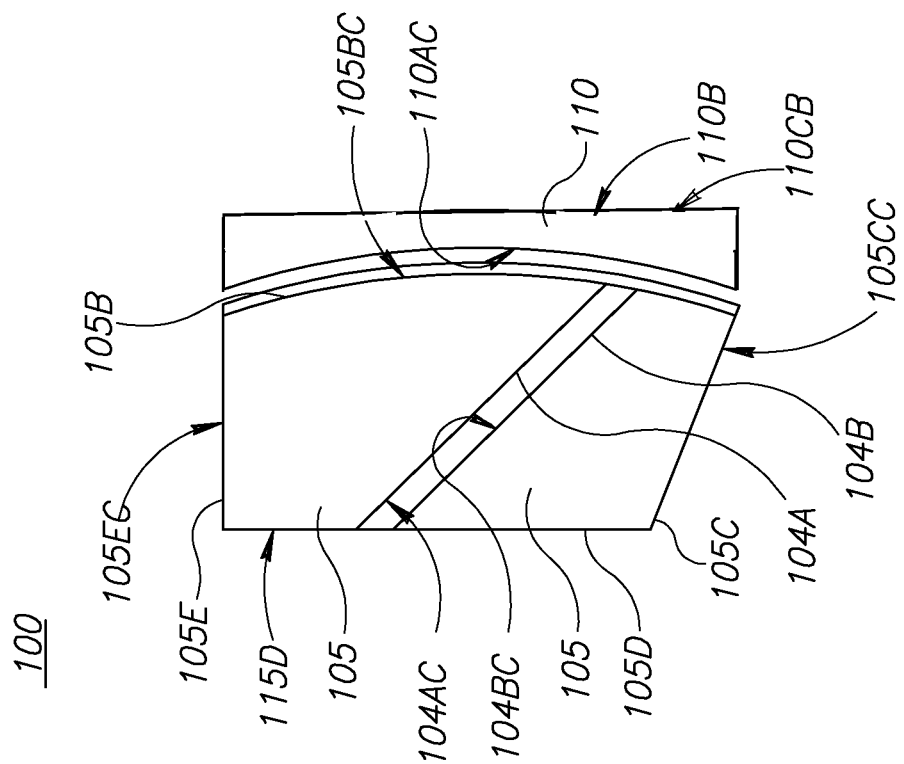
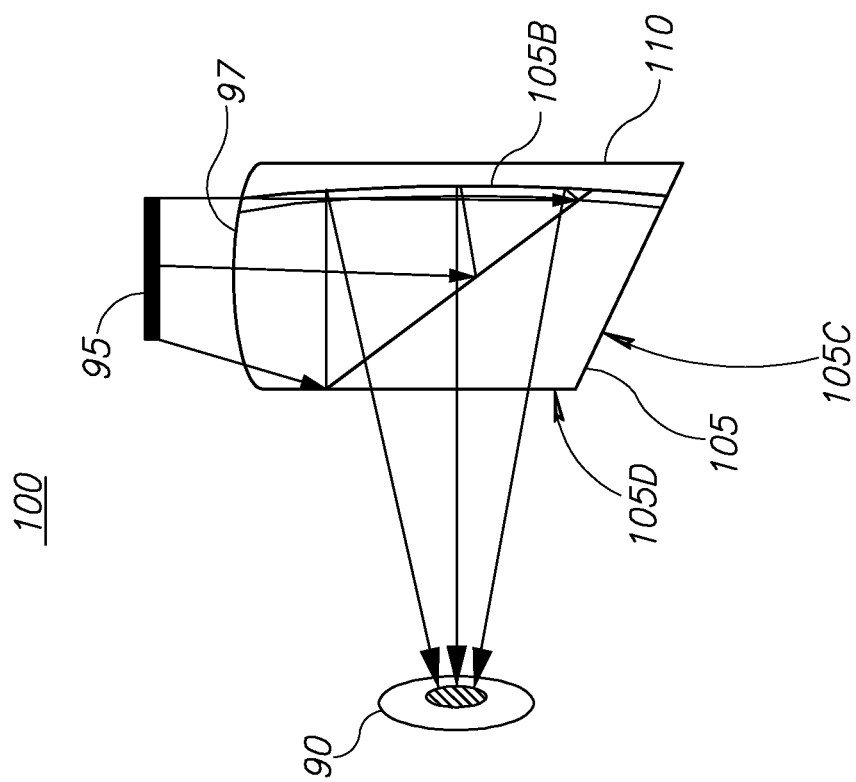
Figure 1F
Figure 1E

CONICAL OPTICAL COMBINER

CROSS-REFERENCE TO RELATED APPLICATIONS

This application is a National Phase Application of PCT International Application No. PCT/IL2018/051250, International Filing Date Nov. 20, 2018, entitled: "A CONICAL OPTICAL COMBINER", published on May 23, 2019, under PCT International Application Publication No. WO 2019/097522, which claims the priority of Israel Patent Application No. 255795, filed on Nov. 20, 2017, which is hereby incorporated by reference in its entirety.

BACKGROUND OF THE INVENTION

1. Technical Field

The present invention relates to the field of optical devices, and more particularly, to optical devices combining see through and display visualization.

2. Discussion of Related Art

Optical devices, in particular head-worn devices, often combine real world observation with added displayed images, e.g., in various augmented reality applications. This combination is challenging due to the difference in sources and variable environmental conditions in which such optical devices are expected to operate in.

SUMMARY OF THE INVENTION

The following is a simplified summary providing an initial understanding of the invention. The summary does not necessarily identify key elements nor limit the scope of the invention, but merely serves as an introduction to the following description.

One aspect of the present invention provides an optical system comprising: (i) a display device with associated optics, (ii) an optical combiner comprising a beam splitter and having a flat small base, a large base which is curved with respect to a plane parallel to the small base, wherein the small and large bases are connected by: a first surface configured to mediate between the associated optics of the display device and the beam splitter, and a curved side which is part of a truncated cone having the small base and the plane as bases; wherein the optical combiner together with the display device with associated optics is configured to deliver rays originated from the display device and to form an image to a viewer with pupil plane parallel to the small base, and wherein the optical combiner is transparent to rays reaching from a real world scene entering the optical combiner through the large base and passing through the beam splitter, (iii) a see-through distortion corrector attached to the large base at a curved surface of the see-through distortion corrector, wherein the see-through distortion corrector further has a flat side facing the scene, wherein the curved side, which is part of a truncated cone, is coated with an absorptive coating, the small base and the flat side of the see-through distortion corrector are coated with anti-reflective coatings; and the large base is coated with a partly reflective coating, and (iv) a shutter positioned in front of the see-through distortion corrector, configured to attenuate or block the rays from the real world scene upon actuation.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 1A-1F are high level schematic illustrations of an optical system, according to some embodiments of the invention;

DETAILED DESCRIPTION OF THE INVENTION

Figure 1A:
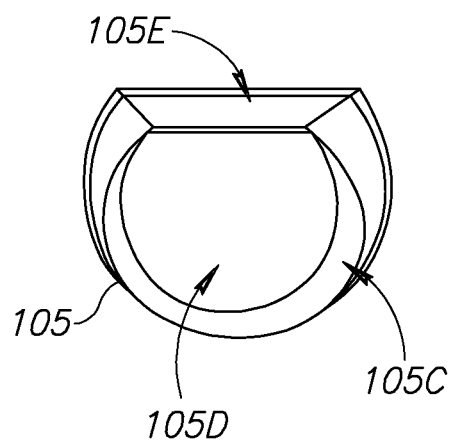
Figure 1B:
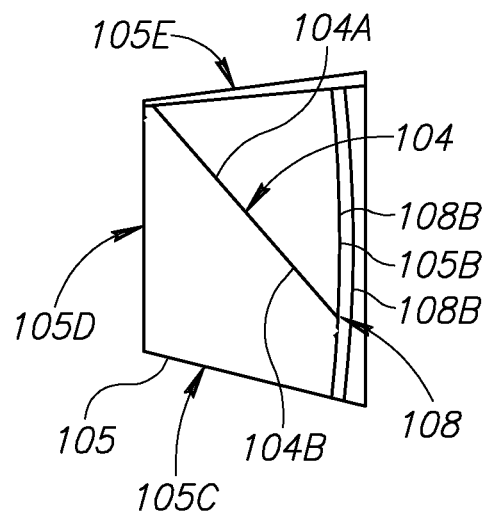
Figure 1C:
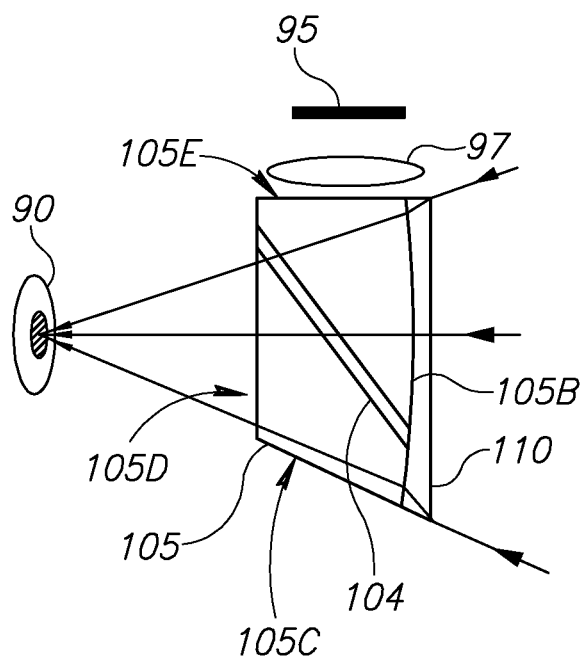
Figure 1D:
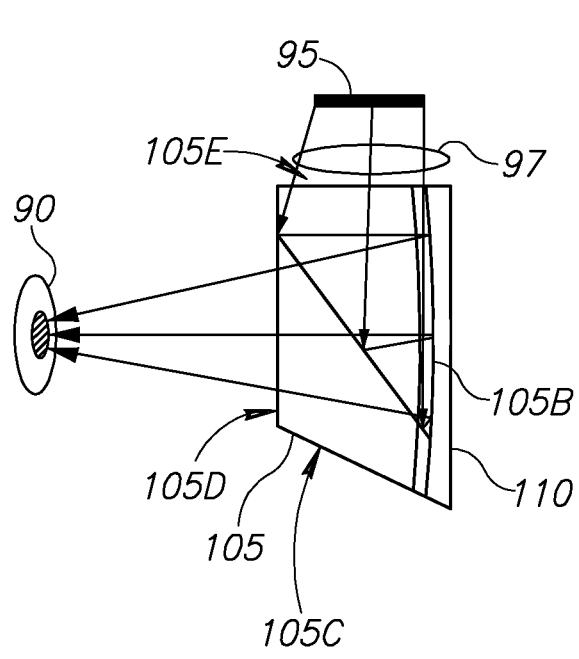

In the following description, various aspects of the present invention are described. For purposes of explanation, specific configurations and details are set forth in order to provide a thorough understanding of the present invention. However, it will also be apparent to one skilled in the art that the present invention may be practiced without the specific details presented herein. Furthermore, well known features may have been omitted or simplified in order not to obscure the present invention. With specific reference to the drawings, it is stressed that the particulars shown are by way of example and for purposes of illustrative discussion of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that may be practiced or carried out in various ways as well as to combinations of the disclosed embodiments. Also, it is to be understood that the phraseology and terminology employed herein is for the purpose of description and should not be regarded as limiting.

Optical systems and methods are provided, which combine see-through view of the real world and display source images using a conical optical combiner cut to have flat surfaces normal to the viewer line of sight. The conical shape minimizes interferences in the view of the real world as the edges of the optical combiner are tangent to the viewer vision field of view and the inner part of the optical combiner is semitransparent. Additionally, the optical system comprises a beam splitter, a shutter(s) for attenuating or blocking the see-through path and may employ polarizing element to improve the contrast between the scene observation and the projected display and thus enabling selective viewing of either. The system may also be configured to enable diopter adjustment and virtual display distance adjustments.

FIGS. 1A-1F are high level schematic illustrations of an optical system 100, according to some embodiments of the invention. FIGS. 1A-1F illustrate schematically an optical combiner 105 in optical system 100 from the viewer point of view (FIG. 1A) and from side view (FIG. 1B), schematic beam paths illustrating the see-through optical path (FIG. 1C) and the display view optical path (FIGS. 1D, 1E) in optical system 100; and optical system 100 in exploded view (FIG. 1F). Surfaces of elements in optical system 100 are denoted by numerals 105B-E and coatings of these surfaces are denoted correspondingly by numerals 105AC-105EC, Optical system 100 comprises an image source 95 such as a display (used herein as a non-limiting example), with associated optics 97 (shown schematically), optical combiner 105 which contains a beam splitter 104 with partly reflective surfaces 104A,104B and curved semi reflective element 108 with partly reflective surfaces 108A,108B possibly having coating(s) 104AC,104BC,108AC,108BC (respectability as explained below) and having a flat small base 105D and a large base 105B which is curved with respect to a plane parallel to small base 105D. Bases 105B, 105D are connected by a surface 105E and a curved side 105C, curved side 105C being part of a truncated cone having small base 105D and the surface 105B as bases. Surface 105E is configured to mediate between associated optics 97 of the image source 95 and optical combiner 105. In certain embodiments (e.g., illustrated schematically in FIG. 1E) associated optics 97 may be integrated into flat side 105E of optical combiner 105, forming optical-combiner-integrated associated optics 97. This option may be applied in any of the embodiments of system 100, depending e.g., on the required field of view and system dimensions.

Optical combiner 105 is configured to deliver, to a pupil plane 90 parallel (or close to parallel, deviating e.g., by 1°, 5°, 10° or any intermediate value from the parallel surface) to small base 105D, rays (FIG. 1D) from image source 95 entering optical combiner 105 through surface 105E as well as rays (FIG. 1C) from a real world scene entering optical combiner 105 through large base 105B, passing through beam splitter 105A and reaching a pupil plane 90.

Optical system 100 further comprises a see-through distortion corrector 110 attached to surface 108B of curved semi reflective element 108 is attached to large base 105B at a curved surface of see-through distortion corrector 110. See-through distortion corrector 110 further has a flat side 110B facing the real-world scene and curved surface on the other side 110A, and when attached to large base 105B via curved semi reflective element 108 cancels any optical power of optical system 100 for rays reaching from the real-world scene to the pupil plane and thus prevents distortions of the real world view.

As illustrated in the exploded view of FIG. 1F, corresponding coatings may be applied to element surfaces in system 100. Curved side 105C may be coated with a black (or any other effective) absorptive coating 105C. Small base 105D and see-through distortion corrector external surface 110 may be coated with anti-reflective coatings 105DC and 110BC respectively. Surface 105B is possibly coated with semi-reflective coating 105BC, and surface 105B and the inner surface of distortion corrector 110A are possible coated with index matching coatings 110AC. Small base 105D and surface 105E may also be coated with anti-reflective coatings 105DC and 105EC, respectively. beam splitter 104 surfaces 104A,104B may be coated by anti-reflective and possibly index matching coating 104AC, 104BC.

In certain embodiments, examples for image source 95 may comprise micro-displays based on any of the following: OLED (organic light emitting diodes), LED (light emitting diodes), MEMS (micro electromechanical systems), DLP (digital light processing), scanning mirror(s), LCOS (liquid crystal on silicon), LCD (liquid crystal display). System 100 and/or elements thereof may be made of various materials such various types of glass, of plastic and combinations thereof.

Figure 2A:
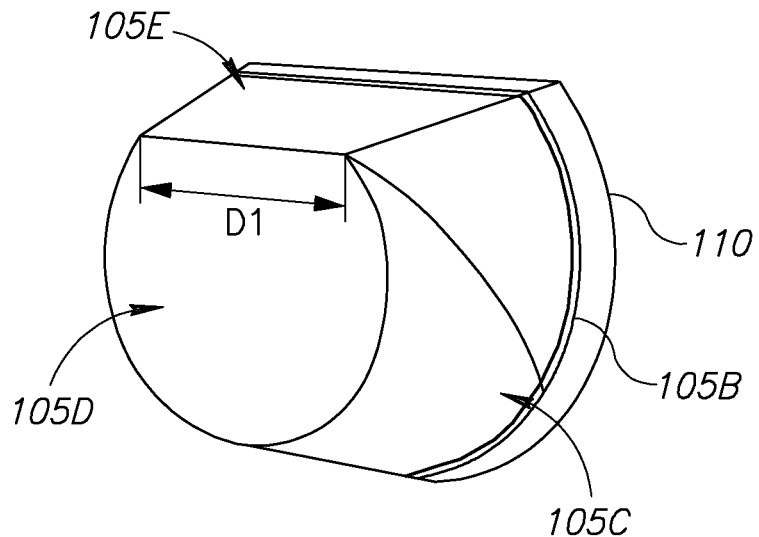
FIGS. 2A and 2B are high level schematic illustrations of the beam splitter and see-through distortion corrector in the optical system, according to some embodiments of the invention.
Figure 2B:
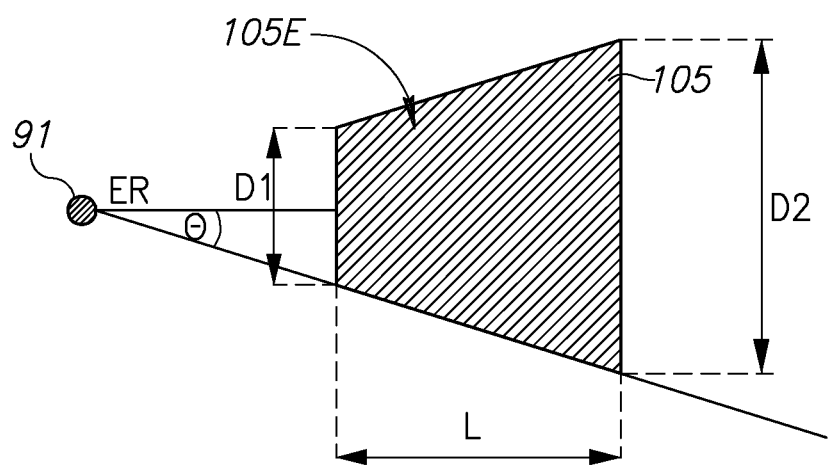

FIGS. 2A and 2B are high level schematic illustrations of optical combiner 105 and see-through distortion corrector 110 in optical system 100, according to some embodiments of the invention. FIGS. 2A and 2B schematically illustrate the geometric relations between the width of top front edge (D1) connecting surface 105E and flat small base 105D with respect to viewing point 91 (part of pupil plane 90). D2 denotes the width of large base 105B (and/or corrector 110). ER denotes the eye relief distance, L denotes the length of optical combiner 105 (illustrated schematically in top view), and the cone angle $\theta \approx \mathrm{atan}(0.5 \cdot D1/ER)$. The dimensions of optical combiner 105 may be adjusted mainly to support the display field of view and provide a required eye relief distance. Optical system 100 may be configured as a head-worn device (for one or two eyes) with minimum interference and distortion of the real-world view. The outer parts of optical combiner 105 may be polished to a conic shape to cause minimal cross sectional interferences to the viewer, and may be coated with an absorptive coating to prevent stray light, ghosts and internal reflection. The inner diameter (D1) dimension and outer diameter (D2) dimension of optical combiner 105 may be determined by the dimensions of optical system 100 and the required operation guidelines (e.g., field of view, eye relief, weights and the like).

Figure 4:
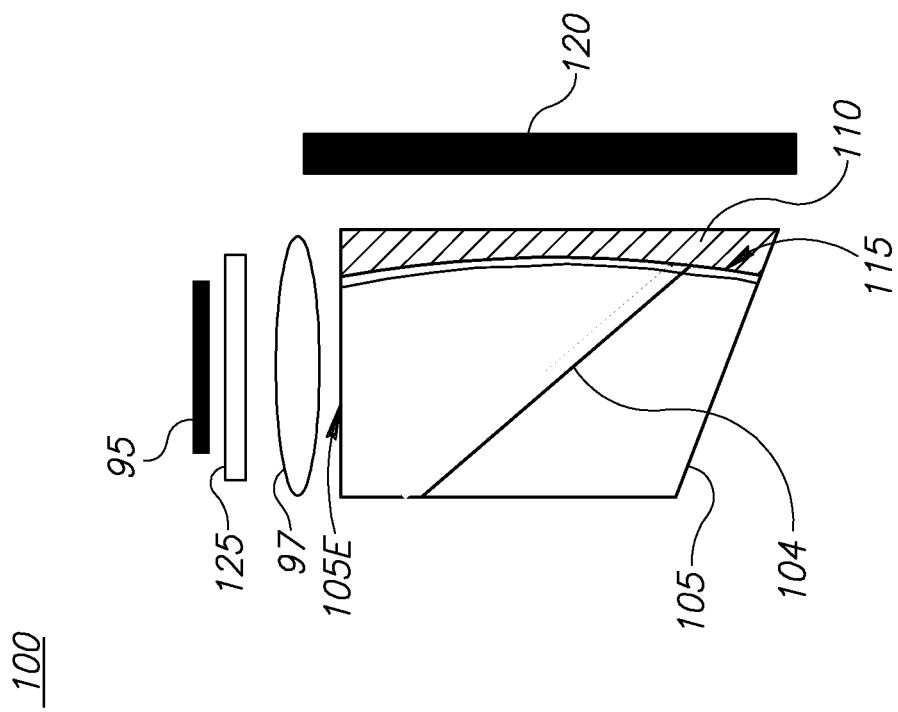
FIGS. 3 and 4 are high level schematic illustrations of the optical system with a shutter, according to some embodiments of the invention.
Figure 3:
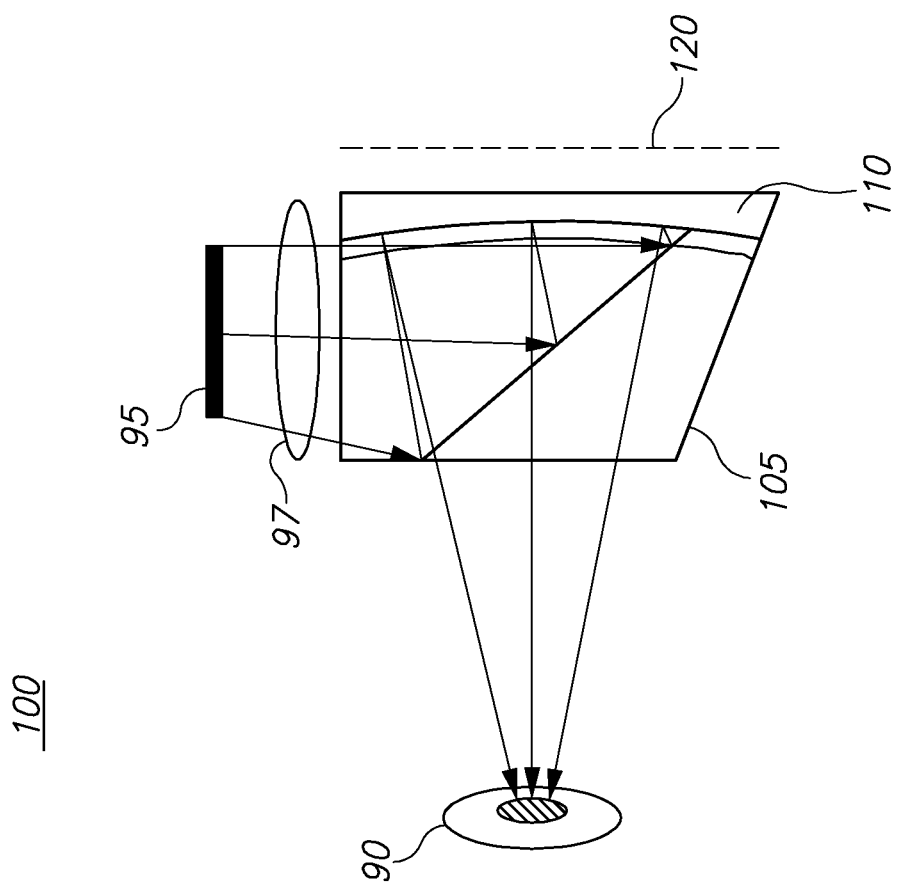

FIGS. 3 and 4 are high level schematic illustrations of optical system 100 with a shutter 120, according to some embodiments of the invention. Optical system 100 may further comprise shutter 120 positioned in front of see-through distortion corrector 110 and configured to attenuate or block the rays (FIG. 1C) from the scene upon actuation. Shutter 120 may be configured to obstruct the see-through path through optical combiner 105 and may be used to increase the contrast of the displayed image on image source 95 and/or to help the user distinguish between the images of the scene and the display.

Shutter 120 may be embedded directly in contact to optical combiner 105 and/or see-through distortion corrector 110, or the shutter may be set at some distance therefrom. The form and/or size may be similar to large base 105B and/or corrector 110 or larger therefrom. Optical system 100 may comprise two optical combiners 105 to provide stereo vision. In such case, shutter 120 may overlap both beam optical combiners 105 and possibly a gap between them. In certain embodiments, shutter 120 may be implemented as any of coatings 105BC, 108AC,108BC,110AC,110BC on large base 105B, curved semi reflective element 108 and/or distortion corrector 110 (see FIG. 1F).

Shutter 120 may be any of an LCD (liquid crystal display) shutter, a polarized LCD shutter, a polymer shutter, an opto-chrome shutter and a mechanical shutter; and may be configured to provide multiple levels of attenuation. For example, shutter 120 may be operated to partly or fully block the see-through path and/or have multiple levels of transparency. Shutter 120 may be spatially variable, i.e., have different regions with different levels of attenuation, possibly corresponding to different regions of image source 95 with respect to their overlapping in beam splitter 104.

Shutter 120 may be configured to be actuated automatically by optical system 100, manually by a user of optical system 100, by a tracker of the user's head or eyes (and/or a gesture identifying device) and/or by an illumination sensor sensing a scene illumination.

A display polarizing filter 125 may be positioned between image source 95 and flat side 105E of optical combiner 105, with shutter 120 implemented as a polarizing shutter large base coating 105BC, being polarized similar to polarizing shutter 120.

According to some embodiments of the present invention, each coating of optical combiner 105 may be polarized. In some cases, even if the display is not polarized, the coatings are. This is done because the optical elements themselves might render the rays polarized and so they behave differently to angles or direction that the rays come from.

For example, Optical combiner 105 may be configured with a polarizing beam splitter (PBS) 104 with corresponding coating 104BC, 104AC, and the polarizations of display polarizing filter 125 and polarizing shutter 120 may be selected to be semi-perpendicular. Beam splitter 104 may be configured to set a predefined relation between rays from the image generator and from the scene (denoted schematically as in FIGS. 1D and 1C). The inventors have found out that applying polarizing elements as described above may improve the see-through image approximately threefold.

Figure 5:
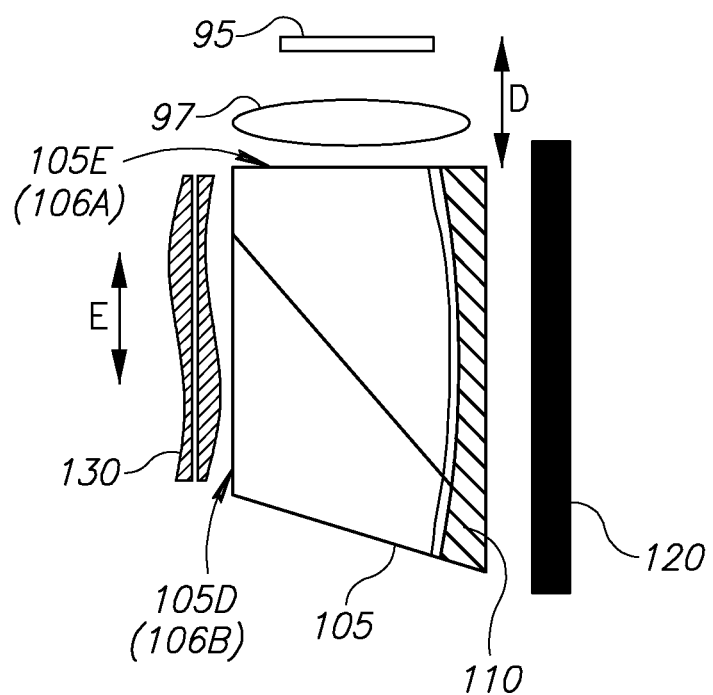
FIG. 5 is a high-level schematic illustration of the optical system with adjustable diopter and display distance, according to some embodiments of the invention.

FIG. 5 is a high level schematic illustration of optical system 100 with variable diopter lens and display source distance, according to some embodiments of the invention. Optical system 100 may be configured to have an adjustable distance (marked D) between image source 95 and surface 105E, and further comprise a variable diopter lens 130 (the two illustrated parts are parallel adjustable as marked by arrow E) between small side 105D and the viewing point (not shown, see viewing point 91 in FIG. 2B). Variable diopter lens 130 may be implemented by a flexible lens as well. Adjustable distance D and variable diopter lens 130 may be adjustable independently and mechanically. Distance D is proportional to the apparent image distance seen by the viewer. Variable diopter lens 130 effects and corrects both the image and the real world view seen by the viewer. Adjustments of lens 130 and distance D may be used to adapt optical system 100 to specific users.

In certain embodiments, denoted schematically in FIG. 5 by numeral 106A, surface 105E and at least a part of optics 97 may be merged to provide a non-flat side 105E with specified optical performance. Moreover, in certain embodiments denoted schematically in FIG. 5 by numeral 106B, flat small base 105D may be configured to be non-flat small base 105D to correct possible image distortions and/or aberrations of image source 95 and/or scene images by optical system 100. For example, such distortions and/or aberrations may be related to the forms of large base 105B (which may be in certain embodiments flat), see-through distortion corrector 110 and possibly the surface of non-flat side 105E. In certain embodiments, two see-through distortion correctors may be applied, one on large base 105B and one on small base 105D. The see-through distortion correctors may be configured to correct distortions and/or aberrations in optical system 100.

In the above description, an embodiment is an example or implementation of the invention. The various appearances of "one embodiment", "an embodiment", "certain embodiments" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention may also be implemented in a single embodiment. Certain embodiments of the invention may include features from different embodiments disclosed above, and certain embodiments may incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A system for optically combining display images with real-world views, comprising:
    an image source configured to emit light;
    an optical combiner comprising a beam splitter and a curved semi reflective element, the beam splitter being orientated to reflect light reaching from the image source away from a pupil plane of a viewer and towards the curved semi reflective element, the beam splitter and curved semi reflective element being held together to form a truncated cone having a small planar base parallel to the pupil plane of the viewer, a curved large base, and a conic surface interrupted by a planar surface parallel to the image source; and
    a distortion corrector having a curved surface coupled to the curved large base of the optical combiner and further having a planar surface facing a real-world view.

2. The system of claim 1, further comprising a shutter positioned between the distortion corrector and real-world view, said shutter being operable to attenuate or block the real-world view upon actuation.

3. The system of claim 2, wherein the shutter is one of a LCD shutter, a polymer shutter and a mechanical shutter.

4. The system of claim 2, wherein the shutter is operable to provide multiple levels of attenuation.

5. The system of claim 2, further comprising a polarizing display filter located between the image source and the planar surface parallel to the image source, wherein the shutter is a polarizing shutter and wherein the curved large base has a corresponding polarized coating, wherein the beam splitter is a polarizing beam splitter.

6. The system of claim 1, wherein the distance between the image source and the planar surface parallel to the image source is adjustable, and wherein the system further comprises a variable diopter lens positioned between the small planar base parallel to the pupil plane of the viewer and the pupil plane of the viewer.

7. The system of claim 6, wherein the distance between the image source and the planar surface parallel to the image source is adjustable independently of, or in correspondence with, the variable diopter lens, the adjustment being affected mechanically.

8. The system of claim 1, further comprising image source optics, wherein the image source optics is located between the image source and the planar surface parallel to the image source.

9. The system of claim 8, wherein the image source optics is attached to the planar surface parallel to the image source.

\* \* \* \* \*